April 22, 1969  S. M. PRINTZ  3,440,307
METHOD AND APPARATUS FOR APPLYING POLYURETHANE
FOAM BACKING TO FABRICS
Original Filed April 30, 1964
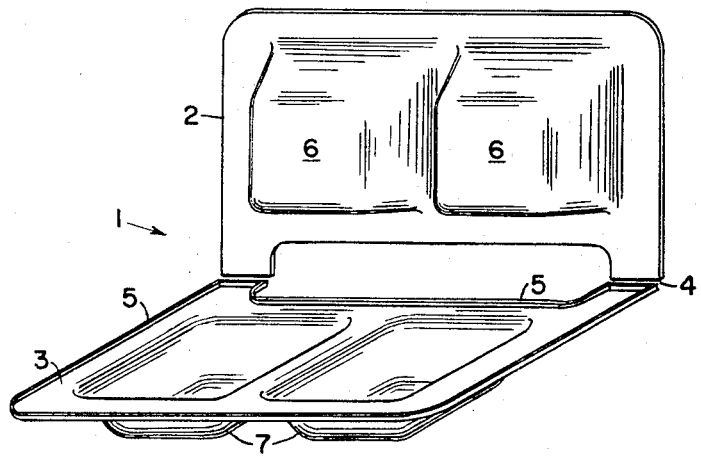
FIG. 1
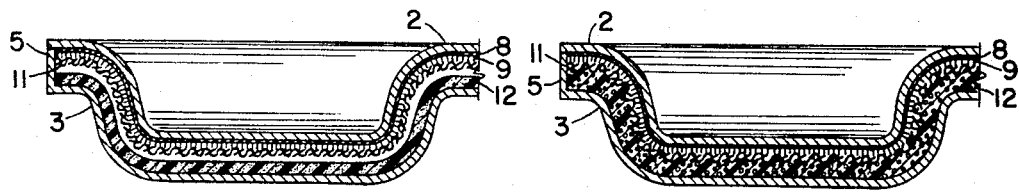
FIG. 2  FIG. 3
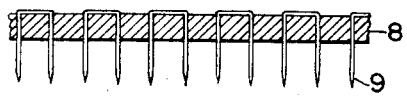 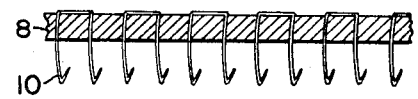
FIG. 4  FIG. 5
INVENTOR
STANLEY M. PRINTZ
BY
Davis, Hoxie, Faithfull
and Hapgood ATTORNEYS

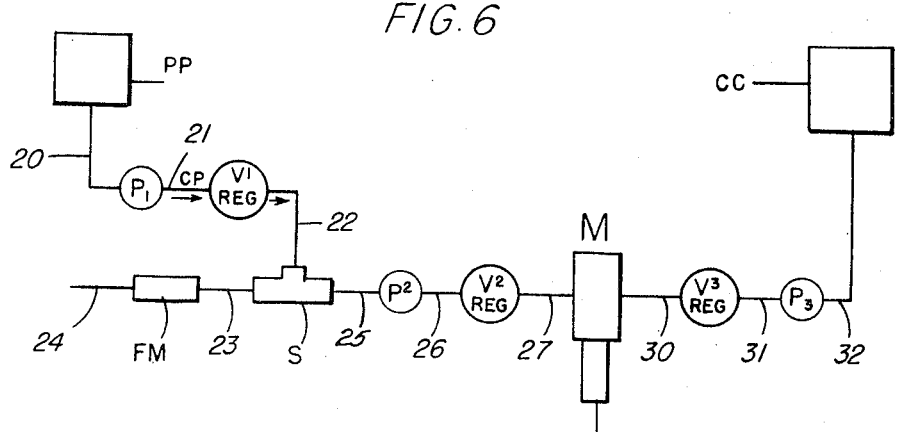
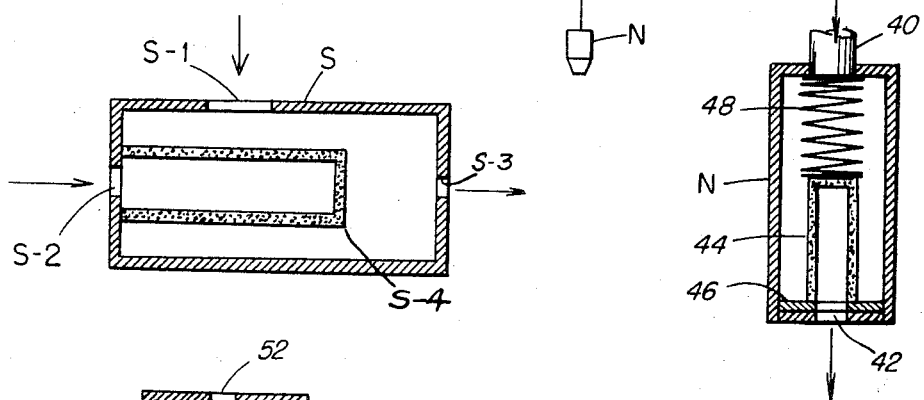
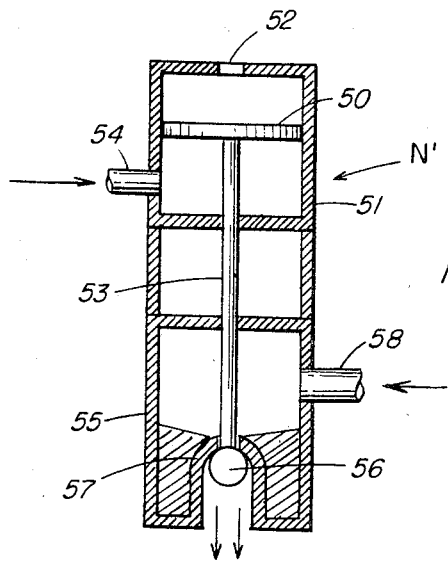

United States Patent Office 3,440,307
Patented Apr. 22, 1969

3,440,307
METHOD AND APPARATUS FOR APPLYING POLYURETHANE FOAM BACKING TO FABRICS
Stanley M. Printz, Chattanooga, Tenn., assignor, by mesne assignments, to West Point-Pepperell, Inc., West Point, Ga., a corporation of Georgia
Application Apr. 30, 1964, Ser. No. 365,562, now Patent No. 3,251,092, dated May 17, 1966, which is a continuation-in-part of application Ser. No. 55,498, Sept. 12, 1960. Divided and this application Aug. 5, 1965, Ser. No. 496,209
Int. Cl. B29g 7/02
U.S. Cl. 264—45                                   6 Claims

ABSTRACT OF THE DISCLOSURE

A two-part mold having means to suspend a fabric, especially fabrics with pile surface, from one part, while the other part is partly filled with a chemically foamable mixture which on expansion engages and adheres to the fabric, and a method to form a composite irregularly shaped article having a cushion backing on the fabric by use of such mold, including the steps of forming a skin on the foamed mixture, heating and curing the mixture in the mold.

---

This application is a division of my copending application Ser. No. 365,562 filed Apr. 30, 1964, and now Patent No. 3,251,092, which is a continuation-in-part of my application Ser. No. 55,498, filed Sept. 12, 1960, entitled, "Method and Apparatus for Making Contoured Fabric Covered Articles," which is now abandoned.

This invention relates to a method and apparatus for manufacturing contour molded articles having fabric facing materials and polyurethane foam padding and, more particularly, to such a method and apparatus as applied to making automobile floor mats.

Many features of the invention are also applicable to floor coverings generally including, without limitation thereto, tufted or woven carpets.

Heretofore, automotive floor pads have been made primarily by three methods:

(1) A rubber pad is molded to a contoured form and then a die-cut jute pad may be laminated by hand to the backing.

(2) A jute or similar pad is molded to form a contoured pad, normally using jute fibers and a thermosetting bonding resin, and carpeting is then laminated to the contoured pad by hand.

(3) Carpeting is backsized with a latex compound and is then coated with foam latex. The material is then die-cut, so that it will fit the contour of the floor of an automobile, and the edges are bound for neatness and to prevent raveling.

All three of these prior methods require considerable amounts of expensive hand labor. The backing or padding materials used in them are also relatively expensive. In addition, these padding materials are subject to attack by chemicals and to damp rot. They frequently give off offensive odors, especially when they are wet. Finally, they have relatively low tensile strength.

One object of this invention is to provide a method and apparatus for making contoured or flat fabric-covered articles having polyurethane foam backings.

Another object is to provide such a method and apparatus in which the fabric covering and the unreacted foam mixture are positioned in spaced, parallel relationship in a mold, with the result that a skin is formed on the foam when it is allowed to expand and penetration of the foam into the fabric, as it abuts against and adheres to the fabric, is prevented.

A further object is to provide such a method and apparatus in which means are provided for quickly attaching the fabric covering to one of the mold members, to support it in an uneven or irregular contour, and for quickly removing it from the mold.

Still another object is to provide such a method and apparatus which minimize the cost of materials and the cost of labor required to make such fabric-covered articles.

A still further object is to provide a method and apparatus for making contour molded articles comprising a fabric covering and a resilient padding in which the padding is strong, odorless, chemically inert and not subject to damp rot.

Other objects and advantages of the invention will appear as it is described in connection with the drawings.

In the drawings:

FIG. 1 is a perspective view of a mold including convex and concave mold members made in accordance with this invention.

FIG. 2 is an enlarged partial sectional view of the mold members in closed position, with a carpet fabric held to the upper mold member and a stratum of polyurethane foam mixture distributed over the surface of the lower mold member before the mixture is allowed to expand.

FIG. 3 is a view similar to FIG. 2 after the polyurethane foam mixture has been allowed to expand.

FIG. 4 is a greatly enlarged partial sectional view of the fabric lining in one form supporting a multiplicity of small straight pins.

FIG. 5 is a view similar to FIG. 4 showing the fabric lining in a modification supporting a multiplicity of small pins which are barbed.

FIG. 6 is a flow diagram for apparatus for preparing polyurethane foam for introduction into the mold.

FIG. 7 is a longitudinal section view of the sparger of FIG. 6.

FIG. 8 is a longitudinal section view of one form of discharge nozzle useful in the apparatus of FIG. 6.

FIG. 9 is a longitudinal section view of another form of discharge nozzle.

Referring now to the drawings, a mold, generally indicated at 1, comprises a convex, or male, member 2 and a concave, or female, member 3. The convex and concave mold members 2 and 3 may be hinged together at 4. The concave mold member 3 preferably has a raised rim 5 around the entire perimeter of its upper surface. Thus, as shown in FIGS. 2 and 3, when the mold is closed, the outer edges of the convex mold member 2 fit snugly on the upper surface of the raised rim 5 of the convex mold member 3.

The convex mold member 2 may have any configuration desired and is illustrated as having two depressed portions 6 extending downwardly from the rest of the member 2. The concave mold member 3 has a shape complementary to that of the convex mold member 2 and accordingly has recessed portions 7 adapted to receive the depending portions 6 of the convex mold member 2. The mold members 2 and 3 are so formed as to have, when the mold is closed, all their surfaces in spaced parallel relationship.

To the inner surface of the convex mold member 2, there are attached, in a suitable manner, a multiplicity of small pins or hooks which project inwardly from the mold member. The pins or hooks may be formed as integral parts of the mold member. Alternatively, they may be supported by a fabric liner 8 which is secured to the mold member 2 in a suitable manner, as by being laminated to the mold surface or attached thereto by a suitable adhesive, as shown in FIGS. 2, 3, 4 and 5. In the form illustrated in FIG. 4, the pins are short, straight pins 9, which are very sharp. This type of pin may be used where the covering material is either a woven or a simple knit fabric.

As a modification, a multiplicity of short hooks or pins 10 which are barbed, as illustrated in FIG. 5, may be used, being as before either integral parts of the mold member or attached thereto by a fabric liner 8, as in the De Mestral Patent 2,717,437. This type of pin or hook is the best and most convenient to use for covering materials which are tufted or deep pile fabrics; this type of pin would also be satisfactory for use with covering materials which consist of fabrics made from hard twist fiber or from monofilament fiber. In either case, the pins 9 and 10 substantially completely and evenly cover the entire inner surface of the mold member 2.

In the carrying out of the invention, a fabric facing material 11, such as carpeting, napped goods or the like, is placed with its face in proper alignment against the inner surface of the convex mold member 2. The fabric 11 is then worked, stretched and smoothed out over the surface of the mold member 2 until there are no puckers, folds or wrinkles in it, regardless of any unevenness or irregularity of contour of the mold. As it is smoothed, the fabric is pressed down to cause the pins or hooks 9 or 10 to engage it positively, either by friction or by hooking. The pins or hooks 9 or 10 are then well enough engaged with the fabric to support and hold it against displacement by the force of gravity.

The concave mold member 3 is treated with a suitable mold release agent. The next step is to distribute evenly a layer or stratum 12 of unreacted polyurethane foam mixture [1] over the inner surface of the mold member 3. The mold is then closed by placing the convex mold member 2 within the concave mold member 3, the construction of the two mold members being such that the fabric facing material 11 is supported by the pins or hooks 9 or 10 in spaced parallel relationship to the polyurethane foam mixture layer 12, as shown in FIG. 2. After the mold is closed, sufficient time is allowed for the foaming reaction to run its course. During this time, a skin or film forms on the upper surface of the foam layer 12. This film is tacky and non-penetrating. As the foam expands sufficiently, it abuts against the fabric facing material 11 and its film or skin serves as adhesive between the foam and the fabric. When the foaming reaction is completed, the mold is heated to cure the polyurethane foam. The mold is then cooled. After cooling, the molded article, including the expanded polyurethane foam, as illustrated in FIG. 3, which is then firmly attached to the facing material 11, is stripped from the mold. After the article has been removed from the mold, it is trimmed, as necessary.

With proper distribution of the foam mixture 12, it will expand and come into contact with the fabric facing material 11, after the film or skin has formed. The film provides firm adhesion by the foam to the fabric 11, but will minimize penetration by the foam into the fabric.

It will be understood that this invention is not limited to use in the making of automobile floor mats, but may also be applied to the manufacture of furniture, as for providing fabric-covered countour-shaped, seating and cushioning materials.

By this invention, there is provided a method and apparatus for manufacturing contour molded articles having fabric facing materials and polyurethane foam padding which is basically a single operation, in the sense that no pretreatment and no subsequent treatment operations are needed (other than trimming) to complete the formation of a contoured floor mat.

Placing of the fabric covering material in the mold is a simple matter requiring very little labor due to the provision of the pins or hooks for attaching and removing the fabric covering material quickly. By making possible working, stretching and smoothing out of the fabric facing material on a mold member, puckering of the fabric is eliminated, regardless of whether the mold has a complicated contour or not. The polyurethane foam backing or padding material is a less expensive backing than are backing or padding materials conventionally used, such as the latex adhesive and the jute pads used in laminating carpeting to molded jute pads. In addition, the polyurethane foam backing is more satisfactory than conventional backing materials because it is chemically inert, not subject to damp rot, odorless, whether wet or dry, and is considerably stronger than either jute felt or molded jute pads.

Because of the provision of a method and apparatus in which the fabric covering material and the polyurethane mixture are initially supported in spaced parallel relationship, the mixture forms a skin or film on its surface as it expands during its reaction time. This film is tacky and non-penetrating, so that it serves as an adhesive between the foam and the facing material with virtually no wastage of the foam due to its penetration into the fabric. No pretreatment of the fabric covering material is required to prevent or control penetration of the foam backing into the fabric. After the initial reaction of the polyurethane foam mixture, its viscosity is fairly high and it will not penetrate fabrics, even those which are very loosely woven.

Moreover, by the method and apparatus of this invention, much better adhesion between the backing and the facing material is obtained than is achieved by conventional composite pads.

In contrast to foam rubber backing, which does not have enough tensile strength to hold a molded pad in proper contour when it is taken out of the mold, unless a high density foam rubber is used which is more expensive than polyurethane foam mixture, a composite article made in accordance with the present invention has much greater tensile strength and, therefore, retains the shape of the article much more satisfactorily. Also, sponge rubber is not practical because of its comparatively high cost.

In a modified form of the invention, firstly the carpet is precontoured as previously described by pressing the pile surface of the carpet against the upper mold member to cause surface engagement of the pile with the flexible hooks 9 or 10 by means of which the carpet is quickly and firmly held in place against all parts of the mold, from which it can just as easily be removed without any noticeable or significant damage whatsoever to the pile.

Secondly, in the modified form, frothing is induced additional to the normal foaming caused by the water-isocyanate reaction in order (a) to lower density of foam, and (b) to improve control of penetration of the foam into the fabric, and (c) to improve control of the material flow, and (d) to enable the foam to be compressed as the mold is closed without reducing the weight of foam per square yard.

Thirdly, in the modified form, a novel effective and reliable method and apparatus are provided for better and more even distribution of the froth into complex molds, such as automobile floor mat molds and the like.

Fourthly, the mold filling and curing techniques differ as to the amount of fill, as to the time of mold closure after the fill, and as to the time when reaction and curing occur with reference to mold closure.

In the modified form of the invention, a prepolymer, e.g. a partially reacted mixture of polyol and isocyanate, having relatively low viscosity is charged with an innocuous gas prior to the addition of water and catalyst thereto. The gas is preferably $CO_2$, but may be air, nitrogen or a low molecular weight fluoroalkane such as Freon

---

[1] It will be understood that although the mixture is referred to as unreacted, in that foaming has not yet occurred to any great extent, it is a "one shot" mixture containing polyol, water, isocyanate and catalyst—all of the reactants required for a urethane foam.

11 or 12. The Freons are less desirable because of their greater cost. To the prepolymer charged with gas is then added water and a catalyst and the mixture may be delivered to a mold as described below.

It is preferred that the prepolymer into which the gas is charged be of relatively low viscosity, say 700–2000 centipoises, though this is not critical and higher or lower viscosities may be used. In some instances using too low a viscosity may lead to wicking of the foam into the yarns of the rug or carpet which is undesirable.

The finished foam density to be economically practical should be in the range of four (4) pounds per cubic foot including the skin on the top as well as on the bottom of a foam layer of an average thickness of ⅜ inch. The density of the skins per se is about sixty (60) pounds per cubic foot.

In molding thin cross sections of polyurethane materials, a good deal of carbon dioxide generated by the water isocyanate reaction is lost in a free blow or free rising system due to large surface area in relation to thickness. This yields a finished foam density higher than can be economically used. Also as the thickness of the foam becomes less, the weight of the skins becomes a greater part of total foam weight.

Thus, to make the foam lighter, it was necessary to compensate for the gas loss in thin cross-section molding, and this is done by this invention by improving the frothing technique by adding gas under pressure in the prepolymer itself at an early stage in the process. From this, unexpected advantages have resulted, among which are:

(a) Better control of the flow of materials, preventing unwanted drainage from vertical or sloping side surfaces of the mold.

(b) Excellent control of the penetration of the foam ingredients into the fabric, so superior to prior practice that it is not necessary to avoid contact with a carpet until a skin is formed, nor need the mold be underfilled so that the foam can rise into contact with the carpet. The mold may be slightly overfilled, volumewise. The lower the froth density, the less the penetration for any given formulation. Hence, control of penetration to the desired degree to obtain the desired fiberlock may be accomplished by metering the quantity of gas into the system, or by raising or lowering the viscosity of the formulation or by a combination of the two.

(c) A third advantage is that any excess of material introduced in the mold will be compressed as the mold is closed, thus providing a convenient means for reducing the thickness in areas where it is necessary without reducing the weight of material per square yard. This is very convenient from the standpoint of metering and distributing the foaming ingredients into the mold.

Apparatus for accomplishing the aforesaid operations and objectives is illustrated diagrammatically in FIGS. 6–9.

Referring to FIG. 6, prepolymer from a reservoir PP is delivered by pipe 20 to a positive displacement pump $P_1$ which is used only to meter, i.e. to deliver in measured exact amount the desired quantity of polyurethane prepolymer. A spring-loaded adjustable pressure regulating valve $V_1$ is connected in the discharge pipe 21 of the pump $P_1$ to maintain constant back pressure against that pump, and assures a uniform delivery rate from the valve V′ to its discharge pipe connection 22, which is connected to a sparger chamber S.

The sparger as shown in FIG. 7 has a cylindrical housing with three openings S–1 in the side wall of the housing being connected to pipe 22, and S–2 in one end of the housing being connected by pipe 23 to a flow meter FM in the supply line 24 from a source of gas, such as $CO_2$ or dry air under pressure. The third or discharge opening S–3 in the other end wall of the housing is connected by a pipe 25 to a positive displacement pump $P^2$.

The sparger has a sintered bronze or stainless steel cylindrical filter S–4 closed except at one end which is attached to the end of the sparger housing around the gas inlet S–2. The filter walls are porous to permit the passage of gas under pressure therethrough. Such spargers are readily available on the market and their construction and operation are well known and understood so that further description of them and their operation need not be given.

The gas is picked up as small discrete bubbles by the prepolymer flowing over the outer surface of the filter. The clearance between the housing and the filter of the sparger does not appear to be critical, nor does the pore size. Filters having average pore sizes from 12–200 microns have been used successfully, but 125–150 average micron size pores are preferred.

The flow meter FM may be replaced by a standing tube open to the atmosphere, under some conditions.

The liquid prepolymer mixed with gas is fed through a pipe 25 to the second pump $P^2$ which has a total volume displacement considerably higher than pump P′. The displacement of pump $P^2$ preferably is from about 20% to about 50% greater than the total volume at atmospheric pressure of prepolymer plus the gas volume that is desired in the system.

With pumps P′ and $P^2$ running, there should be a partial vacuum in the sparger chamber when no gas is introduced.

To allow raising the pressure of the liquid, a second adjustable pressure regulating valve $V^2$ is connected by a pipe 26 to the discharge side of the pump $P^2$, raising the pressure of the liquid-gas mixture to whatever level is needed for gas incorporation. The pressure at the discharge side of the pump $P^2$ is preferably from about 300 to 600 p.s.i., all pressures stated herein being gauge pressures.

The pump $P^2$ functions:

(1) To compress the gas in the presence of the prepolymer and increase the solubility of the gas in the liquid phase. This is particularly true of carbon dioxide.

(2) To disperse completely any gas that is not dissolved.

(3) To stabilize and effectively isolate the metering systems from the rest of the systems.

From the regulating valve $V^2$, the liquid-gas mixture is fed through a pipe 27 to a mixing chamber M.

Into this mixing chamber also is fed through a pipe 30, the catalyst-water mixture at the same pressure as the prepolymer is fed into the mixing chamber. The catalyst mixture is delivered through a pressure regulating valve $V^3$ (of the same type as valves V′ and $V^2$) in the discharge line 31 from a positive displacement pump $P^3$, like pumps P′ and $P^2$. The catalyst mixture is delivered to the intake of pump $P^3$ through a pipe 32 from a reservoir CC.

The pressure in mixing chamber may be somewhat less than it is on the high pressure (intake) side of pump $P^2$ or it may be an integral part of the high pressure section of the system.

For practical reasons and to facilitate metering and introducing the catalyst, the pressure is reduced to about 150 to 300 p.s.i. at the mixer, compared to 600 p.s.i. at the discharge side of pump $P^2$.

After mixing all the components, further reduction to atmospheric pressure is necessary. The manner in which this is done and the distribution of the froth on the mold are critical.

As a discharge nozzle, sintered metal filters available on the market may be used, an example of which is diagrammatically shown in FIG. 8.

In FIG. 8, the nozzle, designated generally by N, has a cylindrical casing with an inlet opening 40 at one end and an outlet opening 42 at the opposite end. Surrounding the outlet is the open end of a replaceable cylindrical sintered metal filter 44 whose open end is fixedly secured to an annular member 46 of diameter approximately equal to the interior diameter of the casing. A coiled compression spring 48 presses at its inner end against the closed inner end of the filter 44 holding it against the outlet end of the casing, while the opposite end of the spring presses against the inlet end of the casing.

The sintered bronze element used in the nozzle of FIG. 8 serves as a calibrated orifice. Since this is not adjustable to regulate the pressure drop through N, it is necessary to change filters or reduce the surface area of the filter in order to reduce the size of the orifice. The nozzle shown in FIG. 9 is designed to replace the sintered bronze nozzle and circumvent the difficulties that are encountered with it.

Instead of nozzle N, an alternative N' is illustrated in FIG. 9 wherein a piston 50 slides within a cylindrical casing 51 having an opening 52 open to the atmosphere at one end and an opening at the opposite end through which a piston rod 53 is slidable.

A source of air under pressure is connected through a connection 54 to the space between the piston and said opposite end of the cylinder 51.

The piston rod extends through one end of and into a second and separate cylinder 55 which is rigidly connected to cylinder 51, coaxially. The piston rod continues coaxially on through cylinder 51 and out its opposite end and has on its outer end a ball valve 56 adapted to seat against the outer surface of a concave valve seat 57 in said opposite end of cylinder 55. To admit froth to the cylinder 55, a connection 58 is provided in the wall of the cylinder 55.

So long as the pressure of the froth in control cylinder 55 exerted on the ball 56 and transmitted to piston rod 53 exceeds the pressure exerted on the valve-control piston 50 and transmitted to the piston rod 53, the ball valve will be open, allowing discharge of the froth through the nozzle N', the amount of discharge flow of the froth being dependent on the inlet pressure of the froth and the pressure of air in the control cylinder 51 and the opening of the valve.

In both the FIG. 8 and FIG. 9 forms, the wall surface of the discharge aperture is sufficient only to direct the stream of froth.

In either the FIG. 8 or FIG. 9 forms, a pressure drop through the nozzle of 50–300 p.s.i. approximately, is desirable.

The pressure drop through the nozzle, the amount of contact with the inner wall of the nozzle and the ejection velocity of the froth all are factors in determining minimum froth density.

The greater the pressure drop, the lower is the froth density providing the ejection stream velocity which is generally not higher than 10 to 15 feet per second. To obtain a four pound per cubic foot froth, the pressure drop should be 300 p.s.i. with an ejetcion velocity of 5 feet per second.

Starting at pump $P_2$, the downstream pressures are additive. If $V_2$ is set at 150 p.s.i. when there is zero p.s.i. pressure drop through the mixer and nozzle, then the pressure will increase to 300 p.s.i. when the nozzle is adjusted to give a pressure drop of 150 p.s.i.; or it will be 450 p.s.i. if the pressure drop through the nozzle is 300 p.s.i.

As previously mentioned, pump $P_2$ has a substantially greater volume put through it than the material being metered in by pump $P_1$ through regulator $V_1$. Therefore, $P_2$ isolates the metering pump $P_1$. If the system is cut off at point 23 and no gas is being introduced with both $P_1$ and $P_2$ running, a partial vacuum exists at the sparger chamber S. By inserting a flow control valve at 23, the quantity of gas being introduced can be regulated and the quantity of gas will determine the pressure in the sparger chamber providing the displacement relationship between pumps $P_1$ and $P_2$ remains unchanged. Hence, the pressure of the gas at the sparger may range from a partial vacuum to whatever the pressure is at which the gas is being introduced at point 24. This pressure is additive to the pressure at $V_1$.

A typical example of operation is as follows:

Pumps $P_1$ and $P_2$ only are set at a specific speed to deliver X pounds per minute of prepolymer. $V_1$ is set to give 175 p.s.i. back pressure at point 21, $V_2$ is set to give 600 p.s.i. at point 26 and the nozzle is open so that the pressure at point 27 is 0 to 25 p.s.i. which is due to the fluid friction of the material flowing through the mixer and hose.

An operating pressure is selected, say 250 p.s.i., representing the desired pressure drop from mixing chamber M to nozzle N and $V_3$ is adjusted to give 300 p.s.i. at point 31 or any pressure higher than the pressure drop from M to N. Pump $P_3$ is set to deliver Y pounds per minute of catalyst solution which is required to react with the X pounds of prepolymer. The pressure at $V_2$ and $V_3$ is reduced. Pumps $P_1$, $P_2$ and $P_3$ are started simultaneously and the pressure drop is regulated at the nozzle to the desired 250 p.s.i. $V_2$ is regulated either upwards or downwards to 600 p.s.i. and $V_3$ is regulated either upwards or downwards to 300 p.s.i. At this point, the machine is balanced to deliver the desired amount of prepolymer and catalyst. Gas is introduced into the sparger and the pressure is regulated as necessary at $V_1$. Normal procedure is to regulate the gas pressure at point 24 to 40 to 50 p.s.i. and place a needle valve and check valve at 23 to regulate the gas flow into the sparger and prevent any material from flowing into the flow meter when the system is shutdown. The foregoing procedure requires less than one minute to establish a balanced operating condition.

The pressure between $P_2$ and $V_2$ is not critical, but from experience it should be over 200 p.s.i. This is by design the point at which the peak pressure is obtained in the system and generally speaking is what determines the maximum volume of gas that can be incorporated.

The mixer is a conventional pin type, low shear mixer with an adjustable speed motor, preferably fabricated to withstand 1000 p.s.i. internal pressure. Normal operating pressure range in the mixer is generally under 300 p.s.i. It is possible to obtain mixers commercially for such operations. The mixer is not critical in the operation. The most critical part of the operation is controlling the pressure reduction to atmospheric pressure. Hence, the nozzle plus the manner in which the gas is introduced and subsequently compressed with the foam ingredients is most important.

As previously indicated, one of the advantages of froth is the control of viscosity and flow characteristics of liquid polyurethane foam ingredients. This is also a disadvantage when filling the mold since the proper amount of foam ingredients has to be distributed all over the mold. There is little or no significant flow of froth in lateral directions when the mold closes. The foam may be compressed in cross section as the mold closes, but little or no lateral movement occurs. Therefore, any areas within the mold that have not been covered with froth would appear as skips or voids in the finished pad.

To ensure even distribution of the froth over the whole surface of the mold, any suitable apparatus for mechanically moving the nozzle may be provided or, the nozzle may be manipulated by hand to provide even and equal distribution of the froth over the whole area of the mold.

When the foam is to be applied to the back of a flat mat, carpet or fabric, the problem of even distribution is obviously less complicated. It will be understood that the invention is applicable for providing a foam backing on flat carpets and fabric surfaces as well as for use with complex mold and mat formations.

It will be understood that the chemical composition of the one-shot, prepolymer or water-catalyst mixtures referred to in this application are not a part of the invention and any of the polyol-isocyanate combinations conventionally employed in the manufacture of polyurethane foams may be employed. In accordance with normal practice, the diisocyanate is usually 2, 6- or 2, 4-toluene diisocyanate or a mixture thereof. The polyol may conventionally be a polyester or polyether having reactive hydroxyl groups. Typical polyesters are those having the structural formula:

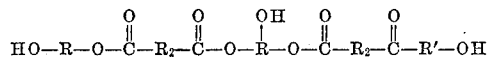

where R, R' and $R_2$ are alkyl groups of less than 30 carbon atoms. Polyethers may include such compounds as polyoxypropylene glycols.

Normally the molecular weight of the polyol will be in the range from say 1000 to say 5000.

The catalysts again are those conventionally used in the art. Morpholine, N-methyl morpholine and triethylamine may be mentioned as substances conventionally referred to in the art as "catalysts," though since they actually enter into the reaction, they are perhaps more properly designated "initiators." Obviously various conventional acceleration inhibitors, plasticizers, coloring materials and the like may be incorporated in the foam mixture, as desired.

In the modified form of the invention using a prepolymer, the degree of reaction of the diisocyanate and the polyol in the mixture of polyurethane foam ingredients prior to addition of the water-catalyst mixture is determined chiefly by the viscosity desired. As noted above, this is preferably in the 700 to 2000 centipoise range. The prepolymer may, therefore, be a substantially unreacted polyol-diisocyanate mixture or it may be reacted to a substantial degree provided that the viscosity does not become so great as to render the process inoperative. In general it may be said that below 700 centipoises, it is difficult (but not impossible) to incorporate sufficient quantity of gas from an external source. High viscosity prepolymers generally accept gas well in frothing, but the viscosity increase attendant with frothing makes it extremely difficult (but not impossible) to handle.

Many modifications within the scope of the invention will occur to those skilled in the art. Therefore, the invention is not limited to the specific embodiments shown and described.

What is claimed is:

1. The method of applying a cushion backing to articles having a tufted pile surface on one side and a woven opposite surface and which are to have an irregular contour when completed, comprising non-adhesively suspending the article from its tufted surface from the under surface of an inverted irregularly shaped mold in exact conformance to the surface thereof by engagement of the top portion only of the pile at a multiplicity of points over the pile surface, applying to a complementary mold layer of a chemically foamable mixture which is capable of forming a tacky skin on both sides of itself as it reacts and foams, said layer being initially of insufficient thickness to engage the woven surface of the article when the mold parts are closed prior to the foaming of the mixture, allowing the mixture to foam and form a skin on both sides of itself and to expand until it abuts against and adheres to said woven surface, and then heating the foamed mixture to cure it in the form of the mold, and removing the finished article by detaching the pile from its support without damage to the pile.

2. The method of applying a cushion backing to articles having a tufted pile surface on one side and a woven opposite surface and which are to have an irregular contour when completed, comprising non-adhesively suspending the article from its tufted surface from the under surface of an inverted irregularly shaped mold in exact conformance to the surface thereof by engagement of the top portion only of the pile at a multiplicity of points over the pile surface, applying to a complementary mold a layer of polyurethane foam mixture which is of insufficient thickness to engage the woven surface of the article when the mold parts are closed prior to the foaming of the mixture, allowing the mixture to foam and form a skin on both surfaces of itself and to expand until it abuts against and adheres to said woven surface, and then heating the foamed mixture to cure it in the form of the mold, and removing the finished article by detaching the pile from its support without damage to the pile.

3. A method of making contoured fabric-covered articles composed of expanded polyurethane foam and a fabric covering therefor, comprising non-adhesively suspending the fabric from its upper surface from the under surface of an upper convex mold member having an uneven inner surface with a multitude of closely spaced relatively small pins attached thereto, securing the fabric on said pins in accurate conformity to said uneven surface and applying to a complementary lower concave mold member a layer of polyurethane foam mixture which is of insufficient thickness to engage the lower surface of the fabric when the mold parts are closed prior to the foaming of the mixture, bringing said convex and concave mold members together thereby forming an enclosure for said polyurethane foam and said fabric, allowing the mixture to foam and to expand until it abuts against and adheres to said fabric, then heating the foamed mixture to cure it in the form of the mold, and removing the finished article by detaching the fabric from the pins.

4. An apparatus for making contoured fabric-covered articles composed of expanded polyurethane foam and a fabric covering therefor comprising upper and lower convex and concave mold members, said upper mold member having an uneven inner surface with a multitude of closely spaced relatively small pins attached thereto for holding the fabric in accurate conformity to said uneven surface, said lower mold member having an inner surface complementary to that of the upper mold member and said convex and concave mold members being adapted to form an enclosure for said polyurethane foam and said fabric.

5. The invention according to claim 4 in which the pins are straight and hold the fabric by friction.

6. The invention according to claim 4 in which the pins are barbed and hold the fabric by hooking into it.

References Cited

UNITED STATES PATENTS

| | | | |
|---|---|---|---|
| 3,005,213 | 10/1961 | Brown et al. | 264—45 XR |
| 3,041,224 | 6/1962 | Sherts et al. | 264—45 XR |
| 3,056,168 | 10/1962 | Terry | 264—54 XR |
| 3,108,976 | 10/1963 | Knox. | |
| 3,116,196 | 12/1963 | Terry | 264—45 XR |
| 3,246,059 | 4/1966 | Moroni et al. | 264—54 XR |

OTHER REFERENCES

Knox, R. E.: "Frothing Processes for Urethane Foams," Du Pont Hylene Foam Bulletin (FB 60-6-22) June 22, 1960, pp. 1–5. Copy in art unit 146 TP 947 F6.

Ferrigno, T. H.: Rigid Plastics Foams. New York, Reinhold, © 1963, pp. 42–46. TA 455 P5F47 c. 3. Copy in art unit 146.

PHILIP ANDERSON, *Primary Examiner.*

U.S. Cl. X.R.

161—159; 249—91; 260—2.5; 261—122; 264—54, 257; 297—452